United States Patent [19]

Lee

[11] Patent Number: 4,487,894

[45] Date of Patent: * Dec. 11, 1984

[54] POLYIMIDE-EPOXY THERMOSET RESINS

[75] Inventor: Chung J. Lee, Sheboygan, Wis.

[73] Assignee: Plastics Engineering Company, Sheboygan, Wis.

[*] Notice: The portion of the term of this patent subsequent to Oct. 18, 2000 has been disclaimed.

[21] Appl. No.: 420,568

[22] Filed: Sep. 20, 1982

[51] Int. Cl.³ .................................. C08G 283/04
[52] U.S. Cl. .................................... 525/423
[58] Field of Search ....................... 525/423

[56] References Cited

U.S. PATENT DOCUMENTS

| | | | |
|---|---|---|---|
| 3,416,994 | 12/1968 | Chalmers et al. | 525/423 |
| 3,663,651 | 5/1972 | Traut | 428/379 |
| 4,277,583 | 7/1981 | Waitkus | 525/423 |
| 4,410,664 | 10/1983 | Lee | 525/423 |

Primary Examiner—Melvyn I. Marquis
Assistant Examiner—A. L. Carrillo
Attorney, Agent, or Firm—Walter J. Monacelli

[57] ABSTRACT

The resins described herein are polyimide-epoxy thermoset resins prepared by reacting a polyepoxide in two steps, first with a solution of a polyimide dianhydride and subsequently with a polyimide diamine, there being enough polyepoxide added initially to react completely with all the anhydride groups and preferably enough polyepoxide added initially to react with both the anhydride and amide groups. "Polyimide dianhydride" is an anhydride-terminated polyimide and "polyimide diamine" is an amine-terminated polyimide as represented by the respective formulas:

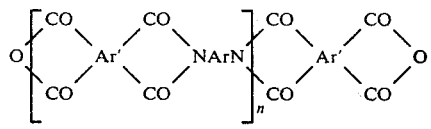

and

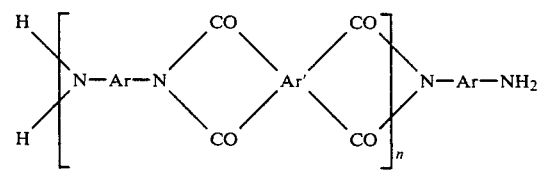

wherein Ar', Ar and n are as defined hereinafter. For use in the present compositions, the polyimide dianhydride has an anhydride activity of at least 0.17 as defined herein, and the ratio of epoxy equivalent to anhydride plus amine equivalents is at least 1/1. By employing a two step reaction scheme, the process offers a more tractable polyimide-epoxy intermediate resin that can be processed into void-free products with superior mechanical properties than polyimide-epoxy thermosets shown in the prior art.

20 Claims, No Drawings

POLYIMIDE-EPOXY THERMOSET RESINS

BACKGROUND OF THE INVENTION

1. Field of the Invention

The invention relates to the preparation of polyimide-epoxy thermoset resins. More specifically, it relates to the two-step reaction of a polyepoxide first with a solution of a polyimide dianhydride and then subsequently with a solution of a polyimide diamine. The polyimide dianhydride used has a relative anhydride reactivity of at least 0.17 and the polyepoxide is used in an amount giving a ratio of epoxy equivalents to anhydride plus amine equivalents of at least 1/1. Still more specifically, a two step reaction is used which offers a more tractable polyimide-epoxy intermediate resin that can be processed into void-free products with superior mechanical strength than previously obtained polyimide-epoxy thermoset resins. Even more specifically, this invention relates to such polyimide-epoxy resins suitable for use as coatings, and the preparation of laminates therefrom suitable for various high temperature applications.

2. State of the Prior Art

The industrial applications of polyepoxides cured with agents such as cyclic anhydrides and polyamino compounds have been known since the early 1950's (see H. Lee and K. Neveille Ed. "Handbook of Epoxy Resins", McGraw-Hill, Inc., 1967, Chapters 1 and 5, and the references therein).

The amine-epoxy addition reaction requires the presence of a hydrogen donor. The primary amine can usually react with two epoxy groups if the resulting secondary amine derived from the primary amine-epoxy reaction does not possess too much steric hinderance. However, the tertiary amines generated by the reaction of two epoxy groups with a primary amine are known to be ineffective catalysts for further epoxy reactions. It is also known that the cyclic anhydride-epoxy reaction in the presence of a catalyst can proceed at temperatures as low as 25° C., even though more moderate temperatures such as 60°-80° C. or higher are usually employed. The reaction of cyclic anhydride with epoxy groups usually starts with the formation of a half ester, a carboxylic acid and a nascent hydroxyl group. The carboxylic acid and the nascent hydroxyl group can react further with the excess epoxy groups through esterification and etherification. The reaction of carboxylic acid with the epoxy groups usually starts at moderate temperatures such as 80° C.–100° C. or higher, whereas the etherification requires not only higher temperatures, that is above 120° C., but also a high epoxy/anhydride ratio and strongly acidic conditions. When a Lewis base is present, the etherification can be excluded completely even at temperatures greater than 120° C., even up to 150° C.

The thermal stability of cyclic anydride or polyamino compound cured polyepoxide can be expected to increase if the thermal stability of the curing agent is increased by using thermally stable moieties for carrying the required reactive functionality. One of the most logical moieties of this kind is a reaction product of an aromatic diamine with an aromatic dianhydride, i.e., an aromatic polyimide moiety. The compatibility between the aromatic polyimides and the polyepoxides is generally very poor due to the large difference of their solubility parameter or cohesive energy density. Since the curing reactions of epoxy with anhydride and epoxy with amine usually start at temperatures of 60° C. to 160° C. which are well below the softening temperature of the aromatic polyimides, which is generally above 200° C., the reaction of the polyepoxide with unfused polyimide-anhydride or polyimide-amine will usually form a thermoset coating on the particulated polyimide and prevent further epoxy-dianhydride or epoxy-amine reaction inside the polyimide particles. It is thus easy to see that even if the degree of polymerization of the anhydride-end capped or amine end-capped polyimide is equal to 3, it is almost impossible to make any well reacted copolymeric product of thermoset polyimide-epoxy resin without the advantage of a good solvent for both the polyepoxide and the polyimide compounds.

It has been found that many of the polyimide diamines and polyimide dianhydrides are not sufficiently soluble for suitable reaction between the polyepoxide and the functional groups in the polyimide compound. It is considered that a polyimide compound having a solubility in a particular solvent of less than 5% by weight is "insoluble" for the purpose of this invention. As described hereinafter, it is possible to improve the solubility of such insoluble polyimide components so that they can react favorably with polyepoxides. For preparing laminates and coatings it is generally desirable to have concentrations of 20% or more.

U.S. Pat. No. 3,663,651 implies that it is possible to make a thermoset PIM-Epoxy resin by reacting polyepoxide with some polyimide dianhydrides derived from pyromellitic or benzophenone-tetracarboxylic dianhydride. Throughout the teaching and working examples of this patent, there is no teaching of a process for forming a soluble reaction polyimide product in the proclaimed solvent systems, such as dimethylformamide (DMF) or N-methyl-2-pyrrolidone (NMP) and an anhydride activity above 0.17. Furthermore, it has been found that when any polyimide dianhydride is prepared using DMF as solvent, there is no detectable anhydride absorption peak (1840 cm$^{-1}$) in the product's infrared spectrum whereas an identical preparation in phenol or m-cresol gives a product with a substantial absorption at 1840 cm$^{-1}$.

The reason for this failure to produce polyimide dianhydrides with high anhydride reactivity ($I_R$) when these amide solvents are used is not known, but it is suspected that there is a reaction occurring between the anhydride groups and these solvents during imidization at high temperatures. As has been found, a complete imidization in these solvents usually requires temperatures above 160° C. (but still below 170° C.) for several hours. It is quite possible that the DMF, as well as related solvents containing n-alkylated amide groups react with the anhydride groups. This results in intermediates which have low anhydride activity, herein defined as $I_R$. However, whatever the reason, it has been found impossible to prepare well reacted polyimide-epoxy thermoset resins from a polyimide dianhydride which is prepared in DMF or a related solvent under prior art known processes.

U.S. Pat. No. 4,277,583 describes the reaction of amine-terminated polyimides with polyepoxides. While reference is made to the fact that these reactions may be performed in the presence of a solvent in which the aromatic polyimide is soluble, Examples VII-XI, XIII, XIV and XVI show coreaction of intimate mixtures of the solid reactants. Example XII describes the reaction as conducted in a DMF solution containing 21.38 g. of amine-terminated polyimide in 75 ml. of DMF together with 3.4 g. of Epon 828. Example XVI is a repetition of Example XII using a different polyepoxide. There is no teaching in this reference of how to conduct a reaction of a polyepoxide in solution with a polyimide component which is insoluble in the particular solvent being used. This is particularly important because of the more thorough and complete reaction effected in solution and also because of the number of polyimide diamines and dianhydrides which are insoluble or poorly soluble. Moreover there is no teaching of a subsequent reaction with a solution of a polyimide diamine after a preliminary reaction with a polyimide dianhydride.

A problem encountered when an anhydride-terminated polyamic acid is used for preparing a polyimide-epoxy thermoset laminate is that delamination occurs when the molding or post-curing temperature is above 180° C. However, since the use of high molding temperatures of this kind (above 180° C.) are required to complete cyclization to imide groups and a complete curing of polyimide-epoxy thermoset resin, such laminates produced from the polyamic type are unsatisfactory. Imidization of a polyamic acid in a good solvent requires temperatures of 120°-160° C. with the final few percent of imidization in the solid state requiring temperatures above 160° C. It is thus possible that trapped volatile product, such as H2O from imidization, introduces flaws or creates delaminations during molding of these laminates or during later applications when the laminate is being exposed to temperatures above 160° C.

It is important therefore, that the method, including the solvent used for preparing the polyimide dianhydride, is one that produces these intermediates with a high anhydride activity ($I_R$). The high $I_R$, good solubility and low fusion temperatures are desirable for good subsequent reaction with a polyepoxide.

In this field of polyimides there are a number of terms which are commonly used, such as "degree of polymerization" (DP), "molar ratio of monomers" ($r_m$), "statistical average of structure reoccurrence" (n), "degree of imidization" (C), "relative reactivity" ($I_R$), and the "ratio of epoxy equivalents to anhydride equivalents". These are defined as follows:

The Molar Ratio of starting monomers is represented as $r_m$ or X/Y, with X representing moles of diamine and Y the moles of dianhydride.

Degree of Polymerization (DP)—Polyimides may be prepared by reacting X moles of diamine with Y moles of dianhydride. To produce an anhydride-terminated polyimide, Y is greater than X. The statistical average "degree of polymerization" (DP) may be calculated on the basis that the formation of the intermediate amic acid groups is completed by the relatively long reaction periods used (at least 3 hours) as compared to the relatively short time for amic acid formation (about 30 minutes). Therefore:

$DP = (1 + r_m)/(1 - r_m)$

Statistical Average of Structure Reoccurrence (n) is equal to:

$(DP - 1)/2 = r_m/(1 - r_m)$

For example, where $r_m$ is 0.5 and DP is 3, then n is 1.

Degree of Imidization (C) is equal to the amount of water distilled from the reaction divided by the amount of water theoretically to be removed by complete imidization. This is equal to (2n×18) grams for making one gram mole of polyimide.

Relative Reactivity ($I_R$) is the ratio of the intensity peak ratio of the absorption peak of the anhydride group at 1840 cm$^{-1}$ to that of the imide group at 1790 cm in the Infrared Spectrum of the polyimide.

Equivalents Ratio of epoxy to anhydride (R) is: R = (No. of equivalent weights of polyepoxide)/(No. of equivalent weights of dianhydride) wherein the number of equivalent weights of a component is the weight of the component divided by the equivalent weight of the component.

With regard to U.S. Pat. No. 3,663,651, repetition of its working examples gives no detectable anhydride absorption peak (1840 cm$^{-1}$) in its infrared spectrum. This means that the anhydride activity ($I_R$) is practically zero. As discussed above, this is believed to be because of reaction between the anhydride groups and DMF.

In producing thermoset products of good properties from polyimide dianhydrides and polyepoxides, it is found to be important that the polyimide dianhydride has an anhydride activity ($I_R$) of at least 0.17 and that it is soluble to the extent described herein. Many of the anhydride-terminated or amine-terminated polyimides do not have sufficient solubility to give satisfactory reaction with polyepoxides for production of void-free molded products and good laminated products. For this purpose it is considered that preferred minimum solubility is that in which one gram of the polyimide is completely dissolved in 4 ml. of the solvent when heated at 165° C. with occasional stirring for 5 minutes.

STATEMENT OF THE INVENTION

In accordance with the present invention it has been found that a polyepoxide reaction can be effectively reacted in solution first with a polyimide dianhydride and subsequently with a polyimide diamine. While the reaction of the polyepoxide with a mixture of polyimide dianhydride and polyimide diamine gives improved results over the reaction of the polyepoxide with either polyimide component individually, it has now been found that still further improvement is effected in a two-step reaction in which the polyepoxide is first reacted with the polyimide dianhydride and subsequently with the polyimide diamine. The polyimide dianhydrides are represented by the formula:

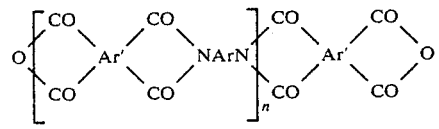

and the polyimide diamines are represented by the formula:

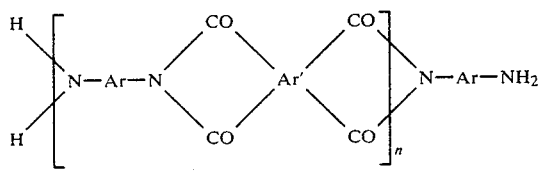

in which formulas Ar' is a tetravalent aromatic organic radical, the four carbonyl groups being attached directly to separate carbon atoms and each pair of carbonyl groups being attached to adjacent carbon atoms in the Ar' radical except that in the case of the Ar' being a naphthalene radical one or both pairs of the carbonyl groups may be attached to peri carbon atoms; Ar is a divalent aromatic radical; and n is an integer of at least one, preferably 1-20.

Since the amine reaction with the polyepoxide requires more stringent conditions, higher temperatures and possibly longer reaction time, the polyepoxide is first reacted with the polyimide dianhydride and subsequently with the polyimide diamine. Sufficient polyepoxide is preferably used initially to react with both the $PI(AH)_2$ and subsequently with the $PI(NH_2)_2$. The PI-$(AH)_2$ reaction with the polyepoxide is conducted in the range of room temperature to 120° C., preferably 50°-80° C. The reaction time depends on the specific temperature being used. For example, 5 hours may be necessary at room temperature whereas 30 minutes may be sufficient at 120° C. The anhydride/amine is advantageously in the range of 0.5/1 to 5/1, preferably in the range of 1/1 to 2/1. The polyepoxide (PE) to $AH+NH_2$ ratio is advantageously in the range of 1/1 to 4/1, preferably 1.1/1 to 1.5/1.

When the polyimide diamine $(PI(NH_2)_2)$ is added, the temperature is raised above that used in the first step. Advantageously this second step is at a temperature of 60°-102° C., preferably at 60°-90° C., for a period of 30 minutes to 5 hours, preferably 1-3 hours.

Generally the product from the second reaction has a viscosity of 200-2000 centipoises, preferably 500-1000 cps. This may be used as such for coating and laminating with the coated or laminated product dried at room temperatures to 70° C., preferably for no more than 1 hour at 70° C. For example, after impregnating glass cloth with the solution and drying the same, the product is cut into strips ($\frac{1}{2}"\times 5"$). Then 20-30 strips are stacked in a die and compression molded at 100-500 psi, preferably 200-300 psi and at 160°-180° C. for 8-20 minutes or longer if desired.

It has been found that the polyimide dianyhydride component or components in the mixture should have a high anhydride activity $(I_R)$, namely at least 0.17 as measured by its infrared spectrum.

For the purpose of this invention, it is considered that a polyimide diamine or dianhydride is not sufficiently soluble if the polyimide component is not dissolved in the particular solvent upon heating 1 g. of the component in 4 ml. of the solvent at a temperature of 167° C. for 5 minutes. When a polyimide component is not sufficiently soluble by itself, it may be made sufficiently soluble by the addition of a soluble polyimide component. The amount of soluble component to be added to impart sufficient solubility to the insoluble component will depend on the respective components. Generally, however, 35-85%, preferably 50-85% of the soluble component based on the combined weight of these components will effect this result. In any particular case it is imperative that the polyimide dianhydride components present each have an $I_R$ of at least 0.17.

Polyimides containing a particular monomer, or possessing a particular recurring structure, can have some superior mechanical properties or thermal stability. For instance, a polyimide derived from 4,4'-methylenedianiline (MDA) and 3,3',4,4'-benzophenonetetracarboxylic dianhydride (BTDA) has better mechanical properties (flexural, tensile strength) than one derived from 2,4-toluenediamine and BTDA. Also, a polyimide derived from pyromellitic dianhydride (PMDA) and oxydianiline (ODA) will have better thermal stability than one derived from BTDA and oxydianiline. However, it is also known that neither of the MDA/BTDA or the PMDA/ODA oligomer dianhydrides nor the corresponding diamines are soluble to the desired extent or fusible below 200° C. When a structurally desired oligoimide diamine or dianhydride is not sufficiently soluble or fusible, the production of good polyimide-epoxy thermoset products is difficult or impossible. Such polyimides may be used by imparting solubility thereto by the addition of a soluble polyimide component.

The particular method of preparing the polyimide component is not critical so long as it gives the desired polyimide structure and the desired functionality of diamine or dianhydride groups, with the dianhydride having an $I_R$ of at least 0.17. In any case, the method of preparing the polyimide dianhydride should be such that it does not destroy the activity of the anhydride groups below the 0.17 level.

When a polyimide dianhydride (C=1) is prepared using the so-called "inert solvent" such as the N,N-dialkylcarboxyl amide class compound recommended by U.S. Pat. No. 3,663,651, the anhydride relative reactive ratio $I_R$ is usually less than 0.17 and the polyamide dianhydride of this kind usually gives products with either very poor mechanical properties or delamination occurs right after mold release. Also, when a polyimide dianhydride also containing substantial amounts of amic acid (such as where C is 0.9 or less) is used, a resin product with moderate mechanical properties is obtained only if the equivalent ratio of epoxy to anhydride is higher than 2/1, so as to give enough epoxy groups to react with the carboxylic acid groups.

Moreover, it should be pointed out that when a polyimide dianhydride has a degree of imidization of less than 1.0 as illustrated in U.S. Pat. No. 3,663,651, it is unrealistic to calculate the equivalents ratio based only on the epoxy and anhydride concentration. As is well known in the art, the carboxylic acid present in an unimidized polyamic acid has an equivalent reactivity toward the epoxy group as does the anhydride group. However, the anhydride group has a functionality of two, whereas the carboxylic acid has a functionality of one. It is thus more reasonable to recalculate the required amount of epoxy for reaction with a polyimide dianhydride which contains also amic acid, based on the equivalent "epoxy" to "carboxylic acid" ratio. It is necessary to have this ratio at least equal to 1/1 in order to obtain void-free polyimide-epoxy thermoset products. The rationale behind this requirement is that when polyamic acids are present, unless enough epoxy is used to react with the carboxylic acids, these polyamic acids will eventually be imidized under curing conditions, or during later exposure to higher temperatures in applications, and thus create flaws or even delamination by the released water vapor.

The polyamide dianhydrides used in the process of this invention may be prepared by using a molar excess of an aromatic dianhydride with an aromatic diamine or an aromatic diisocyanate to form oligomeric or higher molecular weight polyimides. The amine-terminated polyimides used in the process of the present invention may be prepared by using a molar excess of an aromatic diamine with an aromatic dianhydride to form oligomeric or higher molecular weight polyimide dianhydrides. Alternatively, a polyimide dianhydride (prepared by the reaction of an aromatic dianhydride with either an aromatic diisocyanate or an aromatic diamine) may be reacted with one mole of an aromatic diamine for each dianhydride group in the polyimide dianhydride. The aromatic dianhydride has the formula:

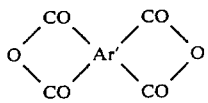

wherein Ar' is a tetravalent aromatic organic radical, preferably containing at least one ring of six carbon atoms, said ring being characterized by benzenoid unsaturation, the four carbonyl groups being attached directly to separate carbon atoms and each pair of carbonyl groups being attached to adjacent carbon atoms in the Ar' radical except that when Ar' represents a naphthalene radical, one or both pairs of carbonyl groups may be attached to peri carbon atoms.

The aromatic diamines useful in these polyimide preparations are represented by the formula $H_2N$—Ar—$NH_2$ wherein Ar is a divalent aromatic organic radical.

In preparing the anhydride-terminated and amine-terminated polyimides, any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 1,4,5,6-naphthalene tetracarboxylic dianhydride, 3,3',4,4'-diphenyltetracarboxylic acid dianhydride, 1,2,5,6-naphthalene tetracarboxylic acid dianhydride, 2,2'3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetra-carboxylic acid dianhydride, naphthalene-1,4,5,8-tetra-carboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetra-carboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianydride, cyclopentane-1,2,3,4-tetracarboxylic acid dianhydride, pyrrolidine-2,3,4,5-tetra-carboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1bis(3,4-dicarboxyphenyl)ethane dianhydride, bis(2,3-dicarboxyphenyl)methane dianhydride, bis(3,4 dicarboxyphenyl) methane dianhydride, bis(3,4-dicarboxyphenyl sulfone dianhydride, and benzene 1,2,3,4-tetracarboxylic acid dianhydride. The first three mentioned dianhydrides are preferred.

In preferred dianhydrides, the Ar' group has one of the formulas

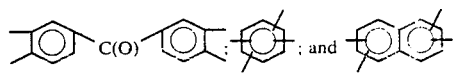

In the last formula the members of each pair of valence bonds are on separate carbon atoms either adjacent to or in peri positions to each other. In the various formulas, positions not occupied by the valence bonds shown are occupied by hydrogen or groups inert to the various reactions conducted in accordance with this invention and may be alkyl, such as methyl, ethyl, etc. or halogen, such as chlorine, etc.

Aromatic diamines useful in preparing the starting polyimides have the formula:

$$NH_2—AR—NH_2$$

wherein Ar is a divalent aromatic organic radical. Preferred aromatic diamines are those wherein Ar is a divalent benzenoid radical selected from the group consisting of:

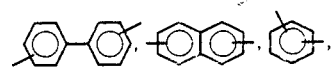

and multiples thereof connected to each other by R''', e.g.:

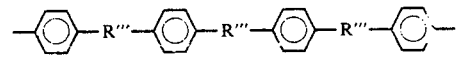

wherein R''' is —CH=CH—,

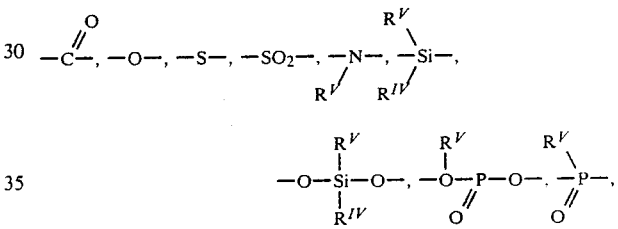

or an alkylene chain of 1–3 carbon atoms, wherein $R^V$ and $R^{IV}$ are each selected from the group consisting of alkyl and aryl radicals containing one to six carbon atoms, e.g., methyl, ethyl, hexyl, n-butyl, i-butyl and phenyl.

In the above formulas for Ar, positions not occupied by the valence bonds shown are occupied by hydrogen or groups inert to the various reactions conducted in accordance with this invention and may be alkyl, such as methyl, ethyl, etc. or halogen, such as chlorine, etc. For example, the group

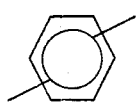

is intended to include:

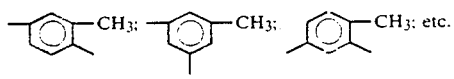

Examples of the aromatic diamines which are suitable for use in the present invention are 4,4'-diaminodiphenyl propane, 4,4'-diaminodiphenyl methane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl diphenylsilane, 4,4'- diaminodiphenyl ethyl phosphine oxide, 4,4'-diaminodiphenyl phenyl phosphine oxide, 4,4'-diaminodiphenyl N-methyl amine, 4,4'-diaminodiphenyl N-phenyl amine and mixtures thereof, 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibrome-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibrome-4,4'diamino diaminodiphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiophenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,4-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol and 2,4-diaminobenzenesulfonic acid and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines.

While the polyimide starting materials may be made from aromatic dianhydrides and aromatic diamines as described above, it is also possible to prepare the polyimides by other methods, such as for example reacting the dianhydrides with aromatic polyisocyanate compounds, preferably aromatic diisocyanates. Suitable polyisocyanates are those in which the amine groups of the above enumerated aromatic diamines have been replaced by isocyanate groups. Preferred diisocyanates are toluene diisocyanate, diphenyl diisocyanate, diphenyloxide diisocyanate, naphthalene diisocyanate, etc. In this alternative method, the polyimide dianhydride is prepared by using a molar excess of the starting aromatic dianhydride with the diisocyanate. Polyimide diamines are prepared by first preparing the polyimide dianhydride and then reacting the dianhydride product with a molar amount of an aromatic diamine, as described above, to convert the polyimide dianhydride to the corresponding diamine.

The polyimide starting materials used in the process of this invention may be prepared conveniently by the method shown in U.S. Pat. Nos. 3,897,395 and 4,058,505 by reacting the dianhydride with the diamine in a phenol solvent of the formula:

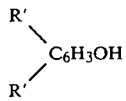

where each R' is hydrogen, halogen or a methyl radical in the presence of certain organic azeotroping agents, particularly cyclic hydrocarbons of 6 to 8 carbon atoms and most preferably benzene or toluene until most of the water of reaction is eliminated. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially the trap is filled with azeotroping agent.

Typical examples of the phenol solvent are phenol, o-cresol, p-cresol, m-cresol, o-chlorophenol, m-chlorophenol, p-fluorophenol, 2,4,6-tribromophenol. The most desirable phenol solvent should have a melting temperature below about 80° C., preferably 60° C., such as phenol ($T_m$—35° C.), o-cresol ($T_m$—30°-32° C.), m-cresol (liquid at 25° C.), etc. Other inert solvents such as dimethylsulfoxide, sulfolane, etc. are rather poor solvents as compared with the phenol solvents mentioned above but can still be used in some cases.

When a poor solvent is used, the imidization often cannot be completed at temperatures below 170° C. due to the precipitation of the polyimide. The so-called "inert solvent", the N,N-dialkylcarboxylamide class compounds, such as dimethylformamide, N-methylpyrrolidone, as suggested by U.S. Pat. No. 3,663,651 is not recommended since dianhydrides prepared using either DMF or NMP as solvent, have very low anhydride reactivity. The polyimides advantageously are prepared using a monomer molar ratio, $r_m$ less than 1, preferably less than 0.95 but no less than 0.5 in a phenol solvent, in the presence of a Lewis base as catalyst and an azeotroping agent such as toluene until the theoretical amount of water is distilled off the reactor. The reaction requires usually a first stage reaction at temperatures ranging from room temperature to about 80° C., preferably below 60° C. for at least 30 minutes, then a second stage reaction at temperatures ranging from above 100°

C. to about 170° C. or below the boiling point of the solvent. The first stage reaction is carried out at the desired temperature to the extent that all the monomers will be reacted. The second stage reaction, or the imidization reaction, commonly starts at temperatures above 115° C., mostly above 125° C., in the presence of Lewis base catalyst, or starts a few degrees higher without the catalyst and completes at temperatures of about 155°–165° C. if the polyimide is soluble. When the polyimide is not soluble, the imidization often will not be completed even at 165° C. for several hours. After the completion of the imidization, the polyimide is precipitated by the addition of an inert non-solvent such as acetone under rigorous stirring. The finely precipitated powder is dried in a vacuum oven at temperatures above 80° C., but no more than 120° C. to remove all absorbed moisture and solvent until constant weight is achieved.

An alternate way for making polyimide is to prepare the poly-amic acid in an inert solvent. Since most of the poly-amic acid is very soluble, some low boiling solvent such as chloroform, tetrahydrofuran, DMF or even acetone and the admixture thereof can be used. In practice, any inert solvent under the reaction temperature range can be employed. After the formation of the poly-amic acid by rigorous mixing of the homogeneous solution at temperatures from 25° C. to 60°–80° C. for more than 30 minutes, the product is then freed from the solvent. The dried poly-amic acid is heated slowly in a vacuum oven or in a heater fluxed with inert gas, such as nitrogen, from about 80° C. to 200° C. until the theoretical amount of water is removed to produce the polyimide.

For the production of resins by the two-step reaction process of this invention, polyepoxide compounds having at least two epoxy or oxirane groups are used. These have two or more oxirane moieties therein represented by the structure:

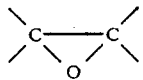

characterized by having an oxygen atom attached to two adjacent carbon atoms. The polyepoxide may possess as high as ten or twenty or even a hundred or more oxirane moieties or structures as in the case of the polyglycidyl acrylates and methacrylates.

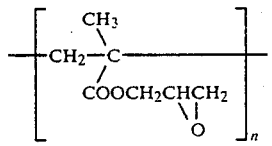

The polyimides advantageously are prepared using a monomer molar ratio, $r_m$ less than 1, preferably less than 0.95 but no less than 0.5 in a phenol solvent, in the presence of a Lewis base as catalyst prepared by the procedure given in the Journal of Macromolecular Science-Chemistry, A3(5), 1207 (1969). The polyepoxide reactants suitable for use in the preparation of the copolymers of this invention are essentially unlimited.

The particular polyepoxide selected for use will depend on such factors as the properties desired in the polymer, cost, reactivity, commercial availability and on practical as well as theoretical considerations. The polyepoxides can be saturated, unsaturated, aliphatic, cycloaliphatic, aromatic and heterocyclic, and can be written as:

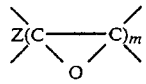

wherein m is a numerical value of at least two and Z is a polyvalent organic radical whose valency corresponds to m and is selected from aliphatic and aromatic structures such as alkylene, substituted alkylenes, alkyleneoxy, alkenylene, substituted alkenylene, arylene, substituted arylene, aliphatic and aromatic amides, imides, esters, ethers and the like. Generally it is not necessary for m to have a value of more than 20. Moreover, the unoccupied valencies of the above formula may be attached to hydrocarbon groups or a plurality of such groups may be joined together such as epichlorohydrin adducts of polyols, and particularly by ether, esters, keto groups, etc.

Useful polyepoxides include glycidyl ethers derived from phenols, especially HOArOH wherein Ar is as previously defined. A particularly suitable epoxide is the diglycidyl ether of bisphenol A of the formula:

Formula A

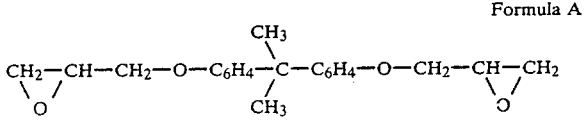

Additional examples of other polyepoxides are: resorcinol diglycidyl ether; 3,3-epoxy-6-methylcyclohexylmethyl-9,10-epoxystearate, 1,2-bis(2,3-epoxy-2-methylpriopoxy)ethane, the diglycidyl ether of 2,2-(p-hydroxyphenyl)propane, butadiene dioxide, dicyclopentadiene dioxide, pentaerythritol tetrakis(3,4-epoxycyclohexanecarboxylate), vinylcyclohexene dioxide, divinylbenzene dioxide, 1,5-pentadiol bis(3,4-epoxycyclohexanecarboxylate), ethylene glycol bis(3,4-epoxycyclobezanecarboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxy-6-methylcyclohexanecarboxylate), 1,1,1-trimethylolpropane tris(3,4-epoxycyclohexanecarboxylate), 1,2,3-propanetriol tris(3,4-epoxycyclohexanecarboxylate), dipropylene glycol bis(3-ethylexyl-4,5-epoxycyclhexane-1,2-dicarboxylate), diethylene glycol bis(3,4-epoxy-6-methylcyclohexanecarboxylate), triethylene glycol bis(3,4-epoxycyclohexanecarboxylate), 3,4-epoxycyclohexylmethyl, 3,4-epoxyclohexanecarboxylate, 3,4-epoxy-1-methylcyclohexylmethyl, 3,4-epoxy-methylcyclohexanecarboxylate, bis(3,4-epoxycyclohexylmethyl)pimelate, bis(3,4-epoxy-6-methylenecyclohexylmethyl)maleate, bis(3,4-epoxy-6-methylcyclohexylmelthyl)succinate, bis(3,4-epoxycyclohexylmethyl)sebacate, bis(3,4-epoxy-6-methylcyclohexylmethyl)adipate, bis(3,4-epoxycyclohexylmethyl)terephthalate; 2,2'-sulfonyldiethanol bis(3,4-epoxycyclohexanecarboxylate), N,N'-ethylene bis(4,4-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis(3,4-epoxy-cyclohexyl)spirobi(metadioxane),

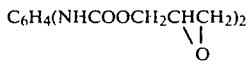

etc.

Another class of suitable polyepoxide reactants comprises the polyglycidyl ether-terminated organic polyhydric alcohols having molecular weights from about 100 to 4,000, and particularly from about 150 to 1,000. The polyhydric alcohols, for example having two or three hydroxy groups, are preferably: poly(oxyalkylene) glycols; alkylene oxide adducts of aliphatic polyols, and polyhydroxy phenolic compounds. The alkylene groups of the poly(oxyalkylene) glycols and alkylene oxides can have from two to four carbon atoms, and particularly from two to three carbon atoms. The poly(glycidyl ether) terminated polyhydric alcohols (polyols) can be represented by the formula:

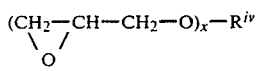

wherein x is an integer such as two or three and $R^{iv}$ represents the polyol residue after removal of terminal hydroxy groups. The diglycidyl ether of bis-phenol A is a satisfactory example of such polyepoxides, as shown in the formula given hereinabove. Illustrative of other polyglycidyl ethers of polyols of the above formula, there can be mentioned those prepared by the reaction of about two moles of epichlorohydrin with one mole of a polyethylene glycol or polypropylene glycol having a molecular weight of 200, 400 or 800, or with one mole of tetramethyleneglycol, tetrapropylene glycol and the like, respectively, or about three moles of epichlorohydrin with trimethylol propane or its adducts with ethylene- or propylene-oxide, etc.

Particularly advantageous oxirane compounds to use for the present invention are the epoxy-terminated polyimides disclosed in U.S. Pat. No. 4,026,904 having as terminal groups:

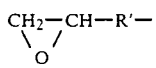

radicals wherein R' is a divalent aromatic radical such as phenylene and other divalent benzenoid radicals listed above as suitable for the Ar radical of diamines used in preparing the polyimides. By using such epoxy-terminated polyimides with the amine-terminated polyimides, the resulting copolymers comprise predominantly or substantially all polyimide structure.

Also suitable for this purpose are Novolac resins to which an appropriate number of glycidyl groups or other oxirane radicals have been attached and represented by the formula:

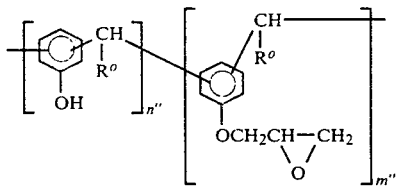

wherein n" and m" are integers representing appropriate numbers of hydroxy and oxirane, and $R°$ represents hydrogen or a hydrocarbon radical of 1 to 10, preferably 1 to 6 carbon atoms, e.g., methyl, ethyl, propyl, allyl, butyl, amyl, hexyl, phenyl, cyclohexyl, tolyl, methylcyclohexyl, etc. Where there are only a few benzenoid repeating units, n" may be zero and all of the hydroxy groups in the Novolac resin may be replaced by oxirane radicals. As the number of benzenoid radicals increases, the relative proportion of oxirane radicals to hydroxyl groups may be decreased in accordance with the desired number of attachments to be made to polyimide molecules. In the Novolac resins substituted benzenoid radicals may also be used as well as polynuclear benzenoid radicals. In the above formulas the sum of the n" and m" integers may go as high as 50 or more and when all of the hydroxy groups are substituted by glycidyl groups, n" will have a value of 0.

Thus such oligomeric oxirane-containing compositions may be represented by the formula:

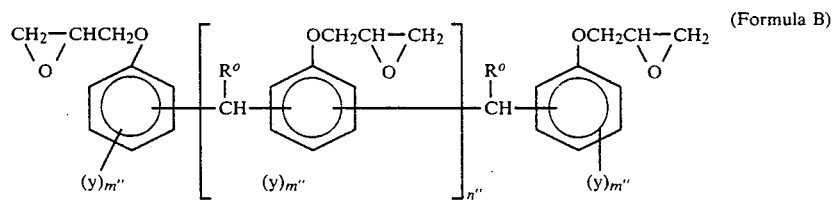

(Formula B)

wherein y represents halogen (e.g. Cl, Br, I or F) or a hydrocarbon radical of 1–18, preferably 1–6 carbon atoms, n" is an integer having a value of 1–50, preferably 1–20, and m" is an integer having a value of 0 to 3. When m" is one, the oligomeric Novolac glycidyl ether will contain three epoxy groups per molecule. The hydrocarbon groups may be alkyl, alkenyl, akynyl, cycloalkyl, and aryl, including alkylaryl, alkenylaryl, cycloalkylaryl, etc. The typical members of these groups are well known and illustrated in the literature. Preferably these are methyl, ethyl, propyl, butyl, amyl, hexyl, etc.

Moreover, in addition to the diglycidyl ether of bisphenol-A described above, various oligomers of this monomer may be used, such as those having the following formula:

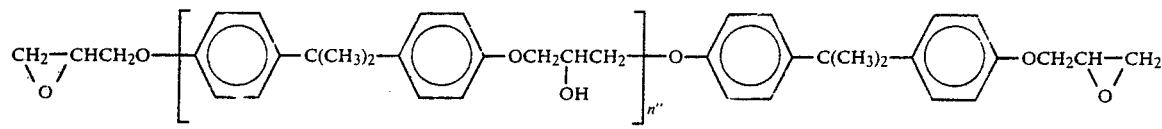

Thus, when n" is zero, the formula reduces to Formula A given hereinabove. Furthermore, the

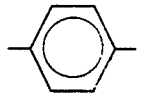

shown in the above formula may be replaced by the

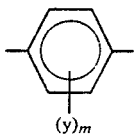

(y)$_m$ shown in the preceding formula and the —C(CH$_3$)$_2$— group may be replaced by methylene, ethylene, ethylidene, propylene, butylene, butylidene groups or oxygen, fulfur, fulfone, or the like.

Additional examples of polyepoxide compounds are given in U.S. Pat. Nos. 3,334,110; 3,341,337; 3,415,901 and 3,440,230 which are hereby incorporated herein by reference thereto.

The preferred epoxies for the practice of this invention, because of their ease of synthesis, availability of intermediates and cost, are the polyepoxides obtained as glycidyl ethers by the reaction of polyhydric phenols, Ar(OH)$_2$ with epichlorohydrin, the various oligomers of these glycidyl monomeric ethers, and the diycidyl ethers of soluble, fusible phenol-aldehyde resins often referred to as Novolac resins.

Glycidyl ethers based on Ar(OH)$_2$ have the formula:

in which some specific examples of Ar are:

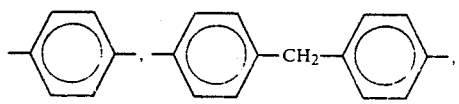

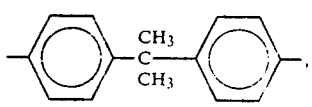

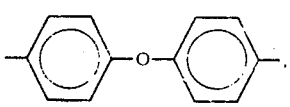

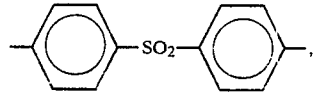

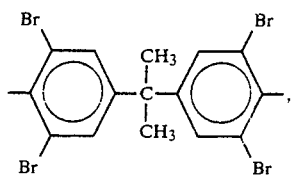

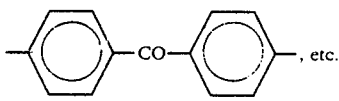

The oligomers of these glycidyl ethers of dihydric phenols may be represented by the formula:

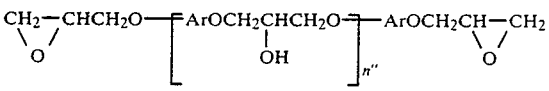

wherein n" is an integer having a value of 1 to 50 or more, preferably 1 to 10; Ar has the same meaning as given above and as illustrated by the various diamines listed above.

Preferred oxiranes based on the Novolac resins have the structure given above in Formula B, particularly those in which R° is H or CH$_3$.

REACTION OF THE POLYIMIDE COMPONENTS WITH THE POLYEPOXIDE

The copolymerization reactions are conducted in solution. The specific solvent will depend on the particular aromatic polyimide used. In most cases the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-alpha-pyrrolidone, tetramethylurea, hexamethylphosphoramide, tetramethylene sulfone, N,N,N',N'-tetramethylethylmalonamide, N,N,N',N'-tetramethylglutaramide, N,N,N',N'-tetramethylsuccinamide, thiobis(N,N-dimethylcarbamylmethyl) ether, N,N,N',N'-tetramethylfuraramide, methylsuccinonitrile, N,N-dimethylcyanocetamide, N,N-dimethyl-alpha-cyanopropionamide, N-formylpiperidine and butyrolacetone, etc.

Preferred solvents are dimethylformamide, dimethylacetamide, N-methyl pyrrolidone, dimethyl sufoxide, butyrolactone and caprolactam.

In many cases, non-aprotic solvents can be used. For example, xylene, phenol, anisole, benzonitrile, aceophenone, methylphenylether, methylene chloride, chloroform, carbon tetrachloride or mixtures of these with each other, with the aprotic solvents or with relatively poor solvents such as benzene, toluene cyclohexane, cyclohexane, dioxane, butyl cellosolve and the like.

The copolymer products can be used as prepared in solution or isolated as a solid product by either evaporating the solvent or by use of a precipitating non-solvent for the polymer. Illustrative precipitating liquids, but not limited thereto, are alcohols such as methanol, ethanol, isoporpanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether and water. Water and methanol are preferred.

The copolymer products of this invention may be used in making molded products, laminated products, as impregnants for various materials, wire coatings, etc. Fillers may be added such as fiberglass, carbon fiber, metal fibers, glass cloth, clays, woodflour, mica and other minerals, etc.

While the reaction of the anhydride or amine and oxirane groups proceeds merely upon heating, it is most advantageous generally to use various catalysts such as tertiary amines and other Lewis acids such as triethylamine, tributylamine, pyridine dimethylbenzyl aniline, tribenzylamine, 2,4,6-tris(dimethylaminomethyl) phenol, triphenyl phosphine, etc. These and other curing catalysts are disclosed in the art, such as the epoxy handbooks published by Dow Chemical Company and others. At least 0.1 percent of such catalyst based on total weight of reagents is desirable.

The reaction of the solution of polyimide components with the epoxy groups of the polyepoxide to produce the polyimide-epoxy thermoset resin takes place in two stages: (1) the chain extending stage or the copolymerization reaction of the polyepoxide first with the polyimide dianhydride and then with the polyimide diamine; and (2) the curing stage. In order to obtain a tractable polyimide-epoxy intermediate resin, the functionalized polyimides can be a solution of two or more polyimide dianhydrides, or an admixture of one of more polyimide diamines. These are first dissolved in a non-toxic, inert solvent at temperatures ranging from room temperature to less than 100° C. (or below the imidization temperature). The solvent used for this stage of reaction is preferably selected from the N,N'-dialkylcarboxylamide class compounds, such as N,N-dimethylformamide, N,N-dimethylacetamide or N-methyl-pyrrolidone, etc. The chain extending reaction takes place at temperatures as low as 25° C. and is still controllable sometimes, at temperatures as high as 120°-130° C., depending on the reactivity of the polyimide components. For instance, the viscosity of a 36% solids solution of a polyimide dianhydride will increase from about 50 to 1,000 cps after 4 hours of mixing at 80° C. The corresponding solution of an admixture of a polyimide dianhydride with polyimide diamine using $r_o=1$, may reach 10,000 cps whereas a polyimide diamine/polyepoxide solution using the same R ratio and solids content will not reach more than 100 cps under the same conditions.

The degree of chain extension or branching, or copolymerization, as indicated by the increase of viscosity, can be, in theory, carried out to the pre-gelling point (10,000 cps in some cases) in order to produce the copolymer of the highest possible molecular weight. In practice, the viscosity of a solution for lamination or other coating applications are desirably in the range of from 100 to 1500 cps, preferably from 300 to 1000 cps. On the other hand, the viscosity of the solution can be as high as several thousand cps when the solution is used for compounding with reinforcing agents or fillers. It should be remembered that the viscosity is not only dependent on the molecular weight, but also on the solids concentration of the solution. Thus the above viscosity ranges, using a solids content of about 30%, should be taken as a guideline, but not as absolute value.

The second stage, or the curing reaction of the polyimide-epoxy intermediate resin takes place after the solvent is freed from the resin. This can be done either by precipitation of the intermediate resin effected by addition of an inert non-solvent, or by evaporation of the solvent at low temperature or under vacuum. For lamination or coating applications, this is usually done after the coating is completed. The solvent is then slowly evaporated at temperature ranges from 25° C. to no more than 100° C.

The curing of the intermediate resins takes place at temperatures above 120° C. to about 200° C., preferably from 160° C. to 180° C. under a pressure from zero to 500 psi for about 1 to 30 minutes, preferably from 5 to 15 minutes, depending on the thickness of the coating or the molded articles.

SPECIFIC EMBODIMENTS OF THE INVENTION

The invention is illustrated by the following examples which are intended merely for purposes of illustration and are not to be regarded as limiting the scope of the invention or the manner in which it may be practiced. Unless specifically indicated otherwise, parts and percentages are given by weight. In the preparation of the anhydride-terminated and amine-terminated polyimides, the continuous azeotropic technique described hereinabove is used.

In the following examples the purity or method of purification of various solvents is as follows:

The N-methyl-2-pyrrolidone (NMP) as sold by GAF Corporation, Chemical Division, has a labeled $T_b=202°$ C. with $n_D^{25}=1.469$. Thus, a 2500 ml round bottom flask containing 1500 ml of NMP is heated to 150° C. and then a vacuum of about 29" (Hg) is applied to the system. The first 50 ml of the distillate is discarded. The collection of NMP distillate starts at 94° C./29" (Hg) and ends at $T_b$—101/30" (Hg). The total distillate collected is about 1300 ml, with about 150 ml of yellowish residual NMP discarded. The freshly distilled NMP is then run through the LINDE Molecular Sieve, Type 4A PLTS, sold by Union Carbide Corporation, Materials System Division.

The N,N-dimethylformamide (DMF) as sold by Fisher Scientific Company, has a labeled $T_b$—152.5°-153.6° C. with a density of 0.944 at 25° C. The DMF is also distilled under vacuum similarly and then dehydrated by Molecular Sieve as described above.

The phenol, as supplied by USS Chemicals, has $T_m$—39.5°-41.5° C., and is used as such.

The m-cresol, as sold by Aldrich Chemical Company, Inc., has a $T_b=203°$ C. with $n_D^{20}$—1.5392 and is used as such.

EXAMPLE I

Procedure for Preparation of Polyimide Dianhydride

Into a 500 ml round bottom flask is loaded 150 ml of phenol with 10 ml of toluene. The solution is quickly heated to 166° C. and 0.4 ml of $H_2O$ is distilled off in about one hour. The distillation is continued for another hour at which time there is no more water obtained in the Dean Stark trap. The solution is cooled to about 60° C., then a solid powder mixture of 24.4 g of 2,4-toluenediamine (TDA) (0.2 moles) and 96.67 g of 3,3'4,4'-benzophenonetetracarboxylic dianhydride (BTDA) (0.3 mole) is added into the solution slowly in order to control the exotherm reaction and solution temperature. The solution is rigorously mixed at temperatures of about 60° C.±3° C. for 2 hours, then 0.2 g of 1,4-diazabicyclo-(3,3)-octane (DABCO) is added and the solution is slowly heated to 160° C. When the solution temperature reaches about 130° C., the first drop of water appears in the Dean Stark trap. The degree of imidization at 145° C. is about 53%, at 153° C. about 84%, at 157° C. about 93%. After 2 hours above 157° C. to the maximum of 160° C., the imidization is completed. A total of 7.2 g of distilled $H_2O$ is recovered. The total reaction time above 150° C. is about 4 hours. The polyimide is precipitated by adding 700 ml of acetone. The yield is 108 g or about 95%. The $r_m$ for this product is 0.667; the DP is 5; n is 2 and the C is 1.0. This polyimide is designated as: [BTDA-TDA]$_2$[AH]$_2$ which is soluble in both NMP, DMA and DMF.

The above procedure is repeated a number of times using various diamine monomers in place of the TDA and various molar proportions of diamine and dianhydride so that n has the value indicated in polyimide dianhydride and polyimide diamine products of TABLE I given below, each of which products is soluble in NMP, DMF and DMA. For each of the polyimide dianhydride thus prepared the $I_R$ is determined to be above 0.17 then tested by infrared spectrum as described hereinafter.

The solubility of each of these polyimide dianhydrides and diamines is tested successfully in dimethylformamide (DMF), N-methyl pyrrolidone (NMP), and dimethylacetamide (DMAC) by the following procedure. To 1 g of the polyimide inside an aluminum pan, 4 ml of the solvent is added. The aluminum pan has a wall thickness of about 1/64" with a diameter of about 2 inches. The mixture is placed on a 167° C. hot plate with occasional stirring for 5 minutes. The solubility is then judged. The melting of these oligoimides is tested by placing about one gram of the oligomer in the aluminum pan and leaving it in a 200° C. oven for 10 minutes.

TABLE I

| No. | Diamine | Polyimide Product |
|---|---|---|
| A-1 | 2,4-toluenediamine (TDA) | [BTDA-TDA]$_2$[AH]$_2$ |
| A-2 | Bis(m-aminophenylene)sulfone (BMAS) | [BTDA-BMAS]$_5$[AH]$_2$ |
| A-3 | m-Xylenediamine (MXDA) | [BTDA-MXDA]$_{20}$[AH]$_2$ |
| A-4 | 2,6-toluenediamine (TDA6) | [BTDA-TDA6]$_{20}$[AH]$_2$ |
| A-5 | 2,4-toluenediamine (TDA) | [BTDA-TDA]$_{20}$[AH]$_2$ |
| B-1 | Bis(m-aminophenylene)sulfone (BMAS) | [BTDA-BMAS]$_5$[NH$_2$]$_2$ |
| B-2 | 2,4-toluenediamine (TDA) | [BDTA-TDA]$_2$[NH$_2$]$_2$ |

TABLE I-continued

| No. | Diamine | Polyimide Product |
|---|---|---|
| B-3 | 3,6-diaminoacridine (DAAC) | [BTDA-DAAC]$_{10}$[NH$_2$]$_2$ |
| B-4 | 2,6-diaminopyridine (DAP) | [BTDA-DAP]$_{10}$[NH$_2$]$_2$ |
| B-5 | m-xylenediamine (MXDA) | [BTDA-MXDA]$_{10}$[NH$_2$]$_2$ |
| B-6 | 2,4-diaminotoluene | [BTDA-TDA]$_{10}$[NHH$_2$]$_2$ |

EXAMPLE II

The Relative Anhydride Reactivity of [BTDA-TDA]$_2$[AH]$_2$

Four polyimide dianhydride are prepared using the monomer component and proportions of the first procedure of Example I but using as solvent equal amounts of (A) NMP; (B) DMF; (C) phenol and (D) m-cresol, respectively.

The relative reactivities ($I_R$) of the respective polyimide dianhydrides are measured as the ratio of the infrared Spectrum adsorption peak of the anhydride at 1840 cm$^{-1}$ to that of the imide at 1790 cm$^{-1}$. These reactivities are reported below in TABLE II.

TABLE II

| Polyimide Dianhydride | Solvent | $I_R$ |
|---|---|---|
| A | NMP | 0.16 |
| B | DMF | 0 |
| C | Phenol | 0.33 |
| D | m-cresol | 0.36 |

EXAMPLE III

The polyimide dianhydrides A, B and C prepared in Example II are tested for reactivity with a Novolac epoxy resin, marketed by Ciba-Geigy, EPN 1138 which has an epoxy equivalent of 185–195. In each case, 25 g of EPN 1138 (0.1351 equivalent) is mixed with 70 g of the polyimide dianhydride A, B or C and 168 g of NMP to solutions of 36% and heated at the temperatures and for the periods indicated below in TABLE III. The ratio (R) of epoxy equivalents to anhydride equivalents in each case is 1.10. The respective viscosities are also reported in TABLE III.

TABLE III

| Polyimide Dianhydride | Solvent Used In Prep. | Temp. | Time | Resultant Viscosity Centipoises |
|---|---|---|---|---|
| A | NMP | 90° C. | 7 hrs. | 32 |
| B | DMF | 80° C. | 8 hrs. | 20 |
| C$_1$ | Phenol | 65° C. | 4 hrs. | 260 |
| C$_2$ | Phenol | 80° C. | 4 hrs. | 1,150 |

The respective viscosities relate to the respective anhydride activities as reported in TABLE II.

The above polyimide-epoxy resin solutions are applied individually onto 181E type glass cloth by hand, spreading and rolling it by using a roller over both faces of the glass cloth. The impregnated fabrics are dried in a well ventilated hood for at least 48 hours, then in a forced air oven at 65° C.–75° C. for about one hour and cut into strips ½"×5". About 25 of the strips are loaded into a mold at temperatures of about 167° C. After the press is closed and pressure is applied (~200 psi), the temperature of the mold is increased to about 180° C.

within about 8 minutes. The die is then opened and the specimen is removed for testing. The tested results are listed below in Table IV.

TABLE IV

| Property of Polyimide Dianhydride-Epoxy Laminate | | |
|---|---|---|
| Example II Content | Flexural Strength/Modulus ($10^{-3}/10^{-6}$) psi | Resin |
| A | Delamination after opening of press | — |
| B | " | — |
| $C_1$ | 48.6/3.1 | 26.3 |
| $C_2$ | 57.5/3.6 | 27.3 |

A polyimide-epoxy laminate using an oligo-imide dianhydride [BTDA-TDA]$_5$[AH]$_2$ prepared as above in NMP solution $I_R=0.12$, $C=1.0$, and following a similar procedure as above also delaminates upon molding.

EXAMPLE VII

An insoluble polyimide diamine and several soluble polyimide diamine components are prepared according to the procedure of Example II. The insoluble diamine is [BTDA-Oxydianiline]$_{10}$[NH$_2$]$_2$ which is insoluble in NMP, DMF and DMAC. The various soluble polyimide diamines are identified below and each is found to be soluble in NMP, DMF and DMAC. These are:

| No. | |
|---|---|
| B-7 | [BTDA-3,6-diaminoacridine]$_{10}$[NH$_2$]$_2$ |
| B-8 | [BTDA-2,6-diaminopyridine]$_{10}$[NH$_2$]$_2$ |
| B-9 | [BTDA-xylenediamine]$_{10}$[NH$_2$]$_2$ |
| B-10 | [BTDA-2,4-diaminotoluene]$_{10}$[NH$_2$]$_2$ |
| B-11 | [BTDA-2,4-diaminotoluene]$_2$[NH$_2$]$_2$ |

A number of mixtures are prepared using the above insoluble and soluble diamine components in an insoluble/soluble ratio ($r_o$) of 0.5/1 with each of the above soluble diamine components. The respective combinations are mixed with NMP, DMF and DMAC and after mixing at room temperature to about 60° C. for at least 30 minutes, each of the mixtures is found to be soluble in each of the solvents.

EXAMPLE VIII

The procedure of Example VII is repeated except that a soluble dianhydride component [BTDA-2,4-toluenediamine]$_{10}$[AH]$_2$ is prepared according to the procedure of Example I and mixed respectively with the following insoluble polyimide dianhydride components prepared according to the procedure of Example I. In each mixture the ratio of insoluble to soluble component is 0.25/1.

| No. | |
|---|---|
| $A_8$ | [BTDA-3,3'-dimethoxybenzidine]$_{20}$[AH]$_2$ |
| $A_{13}$ | [BTDA-1,3-diaminoanthraquinone]$_{10}$[AH]$_2$ |
| $A_{14}$ | [BTDA-m-phenylenediamine]$_{20}$[AH]$_2$ |
| $A_{15}$ | [BTDA-p-phenylenediamine]$_{20}$[AH]$_2$ |
| $A_{18}$ | [BTDA-naphthalenediamine]$_{20}$[AH]$_2$ |
| $A_5$ | [BTDA-m-phenylenediamine]$_5$[AH]$_2$ |
| $A_6$ | [BTDA-p-phenylenediamine]$_5$[AH]$_2$ |

The respective mixtures are found to be soluble in each of DMF, NMP and DMAC.

EXAMPLE IX

Diisocyanate Procedure for Preparation of Polyimide Dianhydride

A 200 ml around bottom flask is loaded with 86 ml of N-methyl-alpha-pyrrolidone (NMP), 16.1 gm (0.1 equivalent) of 3,4,3',4'-benzophenonetetracarboxylic dianhydride (BTDA), 6.5 gm (0.075 equivalent) of toluene diisocyanate* and 0.3 gm aluminum acetylacetonate. The anhydride/isocyanate ratio is 1.33/1. This mixture is heated at 70° C. for three hours and then under a stream of nitrogen at 140° C. for another three hours. The product has the formula:

O[(OC)$_2$C$_6$H$_4$C(O)C$_6$H$_4$(CO)$_2$N—AR—N]$_3$(CO)$_2$Ar'(CO)$_2$O and has an $I_R$ value of 0.26 as measured by infrared spectrum.

*—The toluene diisocyanate is a commercial product comprising 80% 2,4-toluene diisocyanate and 20% 2,6-toluene diisocyanate.

EXAMPLE X (a) A PI(AH)$_2$ is prepared according to the procedure of Example IX to give [BTDA-TDA]$_3$[AH]$_2$ having an $I_R$ value of 0.26.

(b) A PI[NH$_2$]$_2$ is prepared according to the procedure of Example I to give [BTDA-TDA]$_3$[NH$_2$]$_2$.

(c) The PI(AH)$_2$ of above (a) (0.075 equivalent) in 86 ml of NMP is added to 27.75 (0.15 equivalent) of EPN 1138 and allowed to react at room temperature for one hour. Then the PI(NH$_2$) of above (b) (0.075 equivalent) in 87 ml of NMP is added to the PI(AH)$_2$ reaction product and reaction continued at 60° C. for 20 minutes to give a product having a viscosity of 400 cps. This product is used to produce laminates according to the procedure of Example III. The laminate is molded at 200 psi and 160°–180° C. for 10 minutes. The product has a flexural strength of $73.6 \times 10^3$ psi and a modulus of $5.0 \times 10^6$ psi.

EXAMPLE XI

The procedure of Example X is repeated using appropriate amounts of PI(AH)$_2$ and PI(NH$_2$)$_2$ to give an NH$_2$/AH ratio of equivalents of 0.667/1 instead of the 1/1 ratio of Example X. The reaction product has a viscosity of 540 cps and the laminated product has a flexural strength of $48.6 \times 10^3$ psi and a modulus of $3.5 \times 10^6$ psi.

EXAMPLE XII

The procedure of Example X is repeated using appropriate amounts of PI(AH)$_2$ and PI(NH$_2$)$_2$ to give an NH$_2$/AH ratio of equivalents of 2/1. The reaction product has a viscosity of 710 cps and the laminated product has a flexural modulus of $52.9 \times 10^3$ psi and a modulus of $3.45 \times 10^6$ psi.

EXAMPLE XIII

The polyepoxy reaction and laminating procedure of Example Xc is repeated a number of times with similar good results using the PI(AH)$_2$ of Example Xa and in place of the PI(NH$_2$)$_2$ of Xb, using equivalent weights respectively of the following PI diamines as prepared in Example I:

(a) [BTDA—BMAS]$_5$[NH$_2$]$_2$
(b) [BTDA—TDA]$_2$[NH$_2$]$_2$
(c) [BTDA—DAAC]$_{10}$[NH$_2$]$_2$ (d) [BTDA—DAP]$_{10}$[NH$_2$]$_2$
(e) [BTDA—MXDA]$_{10}$[NH$_2$]$_2$
(f) [BTDA—TDA]$_{10}$[NH$_2$]$_2$

EXAMPLE XIV

The polyepoxy reaction and laminating procedure of Example Xc is repeated a number of times with similar good results using the PI(NH$_2$)$_2$ of Example Xb and in place of the PI(AH)$_2$ of Example Xa, using equivalent weights respectively of the following dianhydrides as prepared in Example I:
  (a) [BTDA—TDA]$_2$[AH]$_2$
  (b) [BTDA—BMAS]$_5$[AH]$_2$
  (c) BTDA—MXDA]$_{20}$[AH]$_2$
  (d) [BTDA—TDA6]$_{20}$[AH]$_2$
  (e) [BTDA—TDA]$_{20}$[AH]$_2$

EXAMPLE XV

The polyepoxy reaction and laminating procedure of Example Xc is repeated a number of times with similar good results using the PI(AH)$_2$ of Example Xa and in place of the PI(NH$_2$)$_2$ of Example Xb, using equivalent weights respectively of the soluble mixtures of Example VII.

EXAMPLE XVI

The polyepoxy reaction and laminating procedure of Example Xc is repeated a number of times with similar good results using the PI(NH$_2$)$_2$ of Example Xb and in place of the PI(AH)$_2$ of Example a, using equivalent weights respectively of the soluble PI dianhydride mixtures of Example VIII.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. In a process of reacting a polyepoxide composition with a polyimide composition having terminal anhydride or amine groups, the improvement comprising:
   (a) first reacting said polyepoxide compositions with a solution of a polyimide dianhydride of the formula:

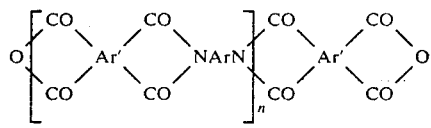

at a temperature in the range of room temperature to about 120° C.; and
   (b) subsequently reacting the reaction product of (a) with a solution of a polyamide diamine of the formula:

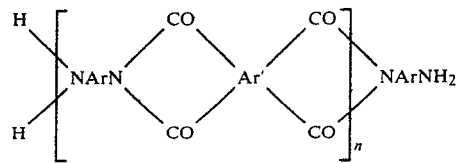

at a temperature in the range of 60° C. to 120° C.; in which formulas:

Ar' is a tetravalent aromatic radical, the four carbonyl groups being attached directly to separate carbon atoms and each pair of carbonyl groups being attached to adjacent carbon atoms in the Ar' radical except that where the Ar' is a naphthalene radical, one or both pairs of the carbonyl groups being attached directly to separate carbon atoms and each pair of carbonyl groups being attached to adjacent carbon atoms in the Ar' radical except that where the Ar' is a naphthalene radical, one or both pairs of the carbonyl groups may be attached to peri carbon atoms;

Ar is a divalent aromatic radical; and n is an integer having a value of at least one.

2. The process of claim 1 in which the temperature at which the reaction (a) is conducted is in the range of 50°–80° C.

3. The process of claim 2 in which the temperature at which the reaction (b) is conducted is in the range of 60°–90° C.

4. The process of claim 1 in which Ar' in both said polyimide dianhydride and said polyimide diamine has a formula selected from the group consisting of:

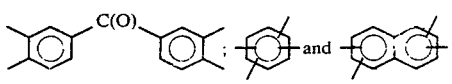

in which last formula the members of each pair of valence bonds are on carbon times either adjacent to each other or in peri positions to each other.

5. The process of claim 1 in which said Ar' in both said polyimide dianhydride and said polyimide diamine has the formula:

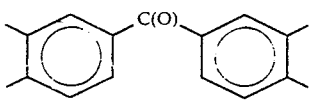

6. The process of claim 5 in which said Ar group in both said polyimide dianhydride and said polyimide diamine is selected from the class consisting of:

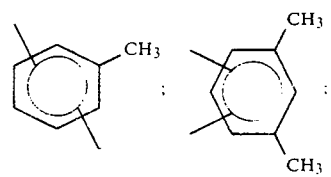

-continued

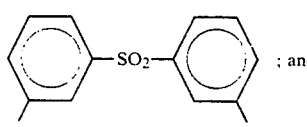 ; and 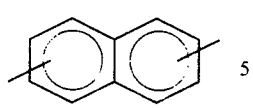

7. The process of claim 5 in which said Ar in both said polyimide dianhydride and said polyimide diamine group is:

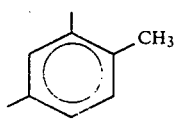

8. The process of claim 6 in which said Ar is:

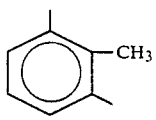

9. A laminate produced by molding glass cloth impregnated with a solution of a polyimide-polyepoxide rection product produced according to the process of claim 1.

10. The laminated product of claim 9 in which said laminated product has been molded at a temperature of about 160°–180° C. and a pressure of about 100–500 psi.

11. The laminated product of claim 10 in which said pressure is about 200–300 psi.

12. The laminated product of claim 9 in which the solvent in said solution is selected from the group consisting of N-methyl-alpha-pyrrolidone, N,N-dimethylacetaminde and N,N-dimethyl formamide.

13. The laminated product of claim 9 in which the solvent in said solution is N-methyl-alpha-pyrrolidone.

14. The laminated product of claim 12 in which the Ar' in both said polyimide dianhydride and said polyimide diamine has a formula selected from the group consisting of:

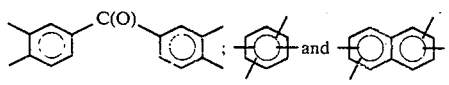

15. The laminated product of claim 14 in which the said formula is:

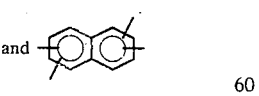

16. The laminated product of claim 14 in which the Ar group of both said polyimide dianhydride and said polyimide diamine has a formula selected from the group consisting of:

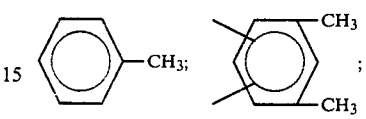

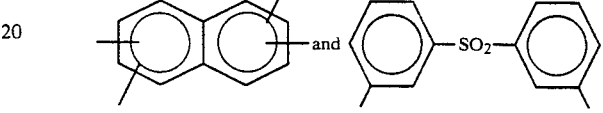

17. The laminated product of claim 16 in which said Ar formula is

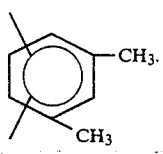

18. The laminated product of claim 15 in which the Ar group of both said polyimide dianhydride and said polyimide diamine has the formula:

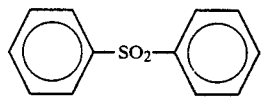

19. The laminated product of claim 15 in which the Ar formula is:

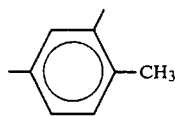

20. The laminated product of claim 17 in which said Ar formula is:

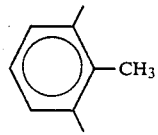

* * * * *

UNITED STATES PATENT AND TRADEMARK OFFICE
CERTIFICATE OF CORRECTION

PATENT NO. : 4,487,894
DATED : December 11, 1984
INVENTOR(S) : Chung J. Lee

It is certified that error appears in the above-identified patent and that said Letters Patent is hereby corrected as shown below:

Col. 8, line 7, correct "AR" to read "Ar".

Col. 15, line 48, correct "AR" to read "Ar".

Col. 15, lines 60-63 correct $-\overset{"CH_3"}{\underset{CH_3}{C=}}$ to read $-\overset{"CH_3"}{\underset{CH_3}{C-}}$ Col. 17, line 3, delete "cyclohexane".

Col. 19, line 40, correct "then" to read "when".

Col. 20, line 16, correct "dianhydride" to read "dianhydrides".

Col. 22, line 15, correct "AR" to read "Ar".

Col. 23, line 35, correct "Example a" to read "Example Xa".

Col. 24, lines 19-24, delete "being attached directly ----- both pairs of the carbonyl groups".

Signed and Sealed this

Fourteenth Day of May 1985

[SEAL]

Attest:

DONALD J. QUIGG

Attesting Officer    Acting Commissioner of Patents and Trademarks